United States Patent [19]

Kline

[11] 4,185,786
[45] Jan. 29, 1980

[54] ROTARY EXTRUSION APPARATUS

[75] Inventor: Donald C. Kline, Allentown, Pa.

[73] Assignee: Lehampton Farms, Inc., Macungie, Pa.

[21] Appl. No.: 933,854

[22] Filed: Aug. 15, 1978

Related U.S. Application Data

[62] Division of Ser. No. 713,349, Aug. 11, 1976, Pat. No. 4,109,448.

[51] Int. Cl.² .............................................. B02C 15/00
[52] U.S. Cl. ........................................ 241/85; 241/91; 241/166; 241/114; 241/120; 241/228
[58] Field of Search ....................... 241/73, 85, 86, 91, 241/107, 110, 114, 113, 117, 119, 120, 166, 227, 228, 229, 235, 84.2

[56] References Cited

U.S. PATENT DOCUMENTS

| | | | |
|---|---|---|---|
| 1,015,337 | 1/1912 | Pancoast | 241/120 X |
| 2,229,141 | 1/1941 | Stacom | 241/228 X |
| 2,764,951 | 10/1956 | Fisher | 241/228 |
| 2,870,481 | 1/1959 | Bonnafoux | 241/228 X |
| 2,875,955 | 3/1959 | Wendshuh | 241/228 |
| 3,079,095 | 2/1963 | Beards | 241/91 X |
| 3,184,171 | 5/1965 | Daman | 241/85 X |

Primary Examiner—Richard B. Lazarus
Attorney, Agent, or Firm—Stanley B. Kita; Howson and Howson

[57] ABSTRACT

Apparatus carried on a self-propelled vehicle field processes alfalfa to obtain therefrom fiber and protein components and a deproteinized liquid component which is simultaneously applied on the field as the vehicle advances. A specially-designed macerator for shredding the harvested alfalfa is disclosed. The macerator includes a cylindrical die ring having an open end and a series of peripheral apertures through which the alfalfa is extruded by means of a pair of rollers mounted inside the die ring for rotation therewith. The die ring is rotatably supported in a frame, and the rollers are coupled to the die ring for rotation in synchronism. A shroud surrounds the periphery of the die ring to collect macerated alfalfa, and an impeller is mounted inside the shroud for displacing macerated alfalfa downwardly through an outlet in the bottom of the shroud.

13 Claims, 5 Drawing Figures

ROTARY EXTRUSION APPARATUS

This is a divisional of application Ser. No. 713,349 filed Aug. 11, 1976 now U.S. Pat. No. 4,109,448.

The disclosure of U.S. Pat. No. 4,109,448 issued on Aug. 29, 1978 to the same inventor is incorporated by reference herein.

FIELD OF THE INVENTION

The present invention relates to a method and apparatus for field-processing vegetation. More particularly, the present invention relates to methods and apparatus for field-processing green-plant vegetation to obtain plant protein and fiber and a deproteinized liquid which is simultaneously discarded on the field.

BACKGROUND OF THE INVENTION

Dehydrated alfalfa is used as a supplement in livestock feed. The dehydrated alfalfa is customarily obtained by a process which involves harvesting alfalfa, hauling the harvested alfalfa to a centrally-located processing plant, heating the alfalfa at the plant to evaporate moisture therefrom, and then pelletizing the alfalfa. The alfalfa is usually dehydrated in rotary kilns which are heated by the combustion of fossil fuels such as oil or natural gas. A significant amount of thermal energy is required to dehydrate the alfalfa in this manner. Hence, with increasing constraints on the supply of fossil fuels, it should be apparent that the cost to produce dehydrated alfalfa by this process will continue to bear a direct relation to the cost of fuel.

Conventionally, alfalfa to be dehydrated is harvested by a self-propelled vehicle which cuts the alfalfa and collects the same in a hopper carried on the vehicle or in a trailer towed behind the vehicle. Although this procedure has the advantage of minimizing mechanical handling of the alfalfa in the field, it requires a substantial amount of energy simply to haul the relatively heavy, moisture-laden alfalfa to the processing plant. Also, the restrictions on the physical size of vehicles which can be used to haul alfalfa on the roads makes it desirable for the alfalfa to be compacted as much as possible for hauling in order to minimize the number of trips required to transport a given weight of alfalfa from the field to the processing plant.

The amount of moisture in the alfalfa can be reduced by sun-drying or field-wilting techniques. These techniques involve cutting the alfalfa, tedding the alfalfa, and gathering the alfalfa after it has dried to the desired moisture level. Although this procedure utilizes free solar energy to evaporate moisture from the alfalfa, solar energy does not provide a reliable source of heat because of the vagaries of the weather. Moreover, this technique is also less efficient since it involves greater mechanical handling of the alfalfa and hence more labor than the conventional procedure.

It is known that mechanical handling of dried alfalfa can cause substantial field losses of valuable plant matter. For instance, as the alfalfa dries, its leaves become brittle. Brittle leaves are easily shattered by mechanical manipulation. As much as 10-20% of the alfalfa plant may be lost from mechanical handling. Also, 5-10% of the dry plant matter can be lost by respiration after cutting. Since the leaves are an important part of the alfalfa plant containing the most protein and the least fiber, it should be apparent that these losses should be avoided where possible.

In addition to the losses due to mechanical handling, sun-drying of alfalfa is known to cause a deterioration in the carotene and xanthophyll content of the alfalfa. These components, together with protein, are normally guaranteed in the analysis of dehydrated alfalfa. Accordingly, it should be apparent that a process whereby a high-quality dehydrated alfalfa product can be produced efficiently is highly desirable.

In recent years, some experimental work has been conducted to demonstrate the practicality of processes for extracting protein concentrates from the alfalfa plant. In these processes, harvested alfalfa is transported to a processing plant where the alfalfa is macerated and pressed to separate the alfalfa into a fibrous fraction and a liquid fraction. The fibrous fraction is retained and dehydrated or used as ensilage, etc. The liquid fraction is heated to a predetermined temperature to cause the plant protein contained therein to coagulate and form a cheeselike curd which floats on a whey or brown juice. The curd is rich in protein, low in fiber content, and high in xanthophyll and carotene. The curd is, therefore, economically valuable as a feed supplement for non-ruminant animals, and especially poultry. For a more detailed description of the above processes, reference is made to the following articles: *Crops and Soils Magazine*, August-September, 1973, pages 12-13; *Report of Fifth Annual Alfalfa Symposium* held on Apr. 8, 1975, in Hershey, Pa.; *Technical and Ergonomic Aspects of the Production of Alfalfa Silage by Fractionation*, paper given at the Eighth International Congress of Agricultural Engineering held in The Netherlands on Sept. 23-29, 1974, by Bouhn, Koegel, Schirer, and Fromin; and a Report entitled *On the Farm Producion of Alfalfa Juice Protein* by Bouhn and Koegel presented at the American Society of Agricultural Engineers Plant Juice Seminar at Madison, Wisconsin on Apr. 27, 1974.

Although the processes described in the above articles are capable of extracting valuable components from alfalfa, they have several limitations. For instance, the processes are performed at a stationary plant location. Thus, the alfalfa (ard the water contained therein) must be hauled to the plant, and this involves the expenditure of substantial amounts of labor and energy. In addition, these processes generate substantial quantities of deproteinized brown juice or whey which must be discarded in an environmentally-satisfactory manner.

OBJECTS OF THE INVENTION

With the foregoing in mind, it is a primary object of the present invention to provide a novel method and apparatus for enabling high-quality dehydrated alfalfa and alfalfa silage to be produced efficiently.

Another object of the present invention is to provide an improved method and apparatus for producing dehydrated alfalfa which is rich in carotene and xanthophyll.

A further object of the present invention is to provide a method and apparatus for enabling high quality dehydrated alfalfa to be produced substantially independent of weather conditions.

It is another object of the present invention to provide a unique method and apparatus for field-processing alfalfa to obtain a fibrous fraction and a liquid fraction having a protein component which is retained and a deproteinized liquid component which is applied onto the field during processing.

A still further object of the present invention is to provide alfalfa-processing apparatus which is sufficiently compact and light in weight as to be capable of being carried on a self-propelled vehicle.

Another object of the present invention is to provide an improved macerator which is of simple but rugged construction and which functions to achieve effective cell rupture of legumes such as alfalfa.

As a still further object, the present invention provides an improved dewatering press which is light in weight, compact and which is capable of expressing a maximum amount of liquid from green plant vegetation such as alfalfa or other legumes.

SUMMARY OF THE INVENTION

The present invention provides specially designed rotary extrusion apparatus for macerating the alfalfa plants. The extrusion apparatus comprises a frame, a die ring carried by the frame, bearing means supported by the frame around the periphery of the die ring to mount the die ring for rotation relative to the frame, roller means disposed in the die ring for extruding alfalfa outwardly through peripheral orifices in the die ring, means for rotating the roller means, and means coupling the die ring to the roller means so that the die ring rotates in synchronism with the roller means. A shroud surrounds the die ring to collect macerated alfalfa, and impeller means between the shroud and the die ring causes the macerated alfalfa to be discharged from an outlet in the shroud as the die ring rotates.

These and other objects, features and advantages of the present invention should become apparent from the following description and drawings.

BRIEF DESCRIPTION OF THE DRAWINGS

FIG. 5 is a greatly-enlarged fragmentary sectional view of an orifice through which plant material is extruded in the extrusion apparatus.

Referring now to the drawings, FIGS. 1 and 2 illustrate apparatus 10 which is particularly suited for harvesting and field-processing green plant vegetation including legumes such as alfalfa 11 but which may be used to harvest other green plant forage crops such as timothy, clover, and mixtures of these and other plants commonly called hay. The apparatus 10 comprises a conventional self-propelled vehicle 13 having an engine which is housed in an enclosure 14 and which supplies power through a suitable transmission to drive high-flotation front and rear wheels 16,16. The wheels 16,16 are steered by an articulated steering system controlled from a driver's compartment 15 located on the front of the vehicle 13. A crop-harvesting header 18 is mounted on the front of the vehicle for cutting the alfalfa 11 as the vehicle 13 advances in the direction indicated by the arrow in FIG. 1.

Figure 1:
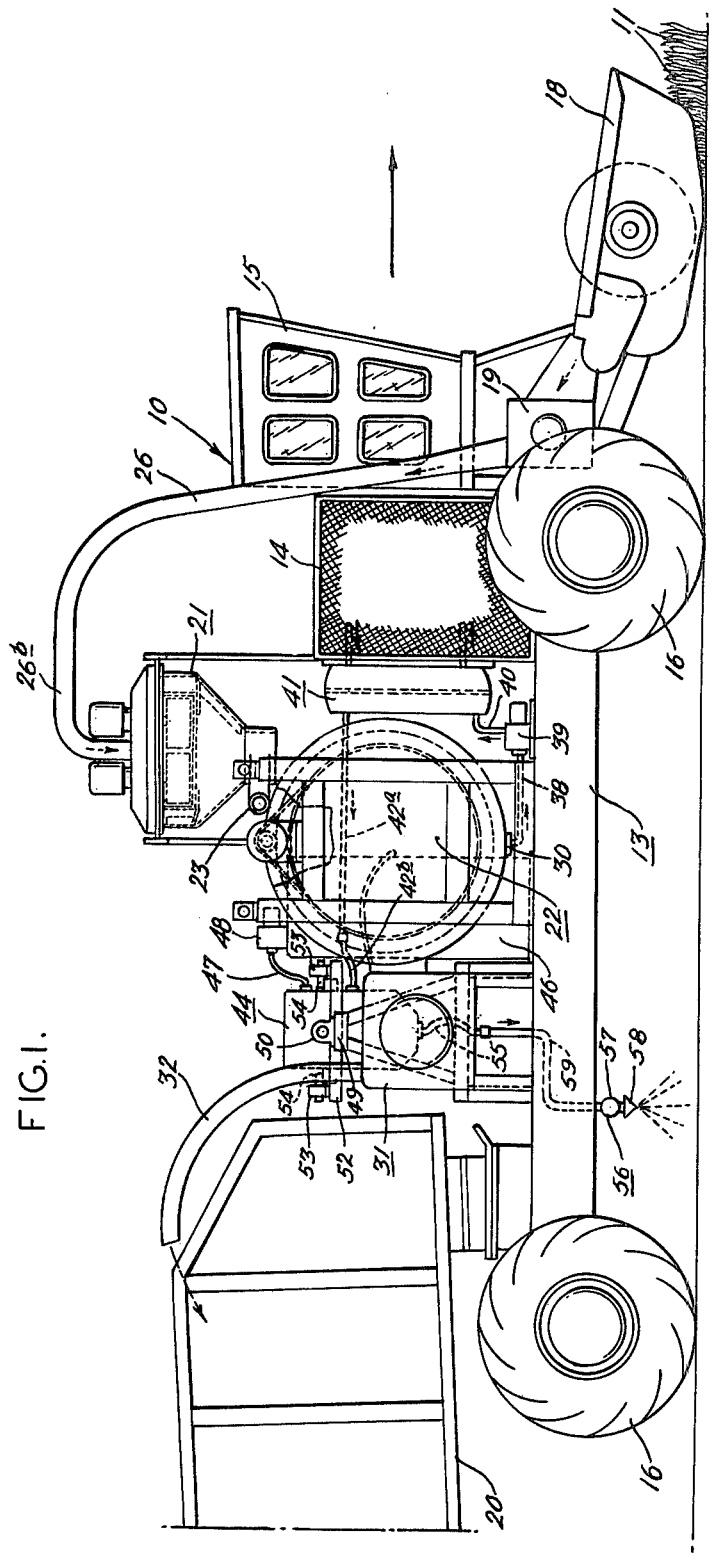
FIG. 1 is a side elevation view of apparatus which is particularly suited for practicing the method of the present invention.

A typical vehicle having a structure similar to the above is manufactured by Champion Products, Inc., of Eden Prairie, Minn. and is sold under its model designation "4-×-4 Articulated."

The header 18 extends transversely across the front of the vehicle 13. The header 18 is designed to cut and convey the alfalfa 11 to a blower-chopper 19 located on the vehicle 13 behind the header 18 and alongside the driver's compartment 15. The blower-chopper 19 functions to convey the alfalfa rearwardly away from the header 18.

In the conventional forage-crop harvester, the alfalfa plants harvested by the header 18 are blow directly into a trailer 20 towed behind the vehicle 13. Thus, when the standing crop of alfalfa 11 has a high moisture content; such as after a rain, the alfalfa collected in the trailer 20 contains a significant amount of water. Heretofore, it was necessary to transport the relatively-heavy, bulky, moisture-laden alfalfa to the dehydrating plant where a substantial amount of thermal energy was required to evaporate the water from the alfalfa.

In accordance with the present invention, the apparatus 10 harvests and field processes alfalfa to minimize the energy required to haul the alfalfa and to dehydrate the same. Specifically, the apparatus 10 is designed to separate from the harvested alfalfa plants a significant amount of the water contained therein and simultaneously to apply the water (which contains chemical compounds valuable as plant fertilizers) directly onto the field.

These advantages are realized by the method of the present invention which comprises the steps of: advancing the mobile harvesting apparatus through a standing crop of alfalfa, harvesting the alfalfa with the apparatus as it advances, separating the harvested alfalfa into a fibrous fraction and a liquid fraction, fractionating the liquid fraction into a first component which has a protein value and a second component which has a fertilizer value, collecting the fibrous fraction and the protein value component of the liquid fraction, and applying the fertilizer value component of the liquid fraction onto the field as the apparatus advances. Thus, the fibrous fraction of the harvested alfalfa is lighter in weight and packs more densely so that it is less expensive to transport; the alfalfa fiber can be dehydrated with less energy; and the liquid fraction by-product is discarded on the field in an economically and environmentally satisfactory manner.

The separating step is performed in a specially-designed rotary extruder or macerator 21 which shreds the harvested alfalfa and a dewatering press 22 which presses the macerated alfalfa to separate the same into a fibrous fraction and a liquid fraction.

Figure 2:
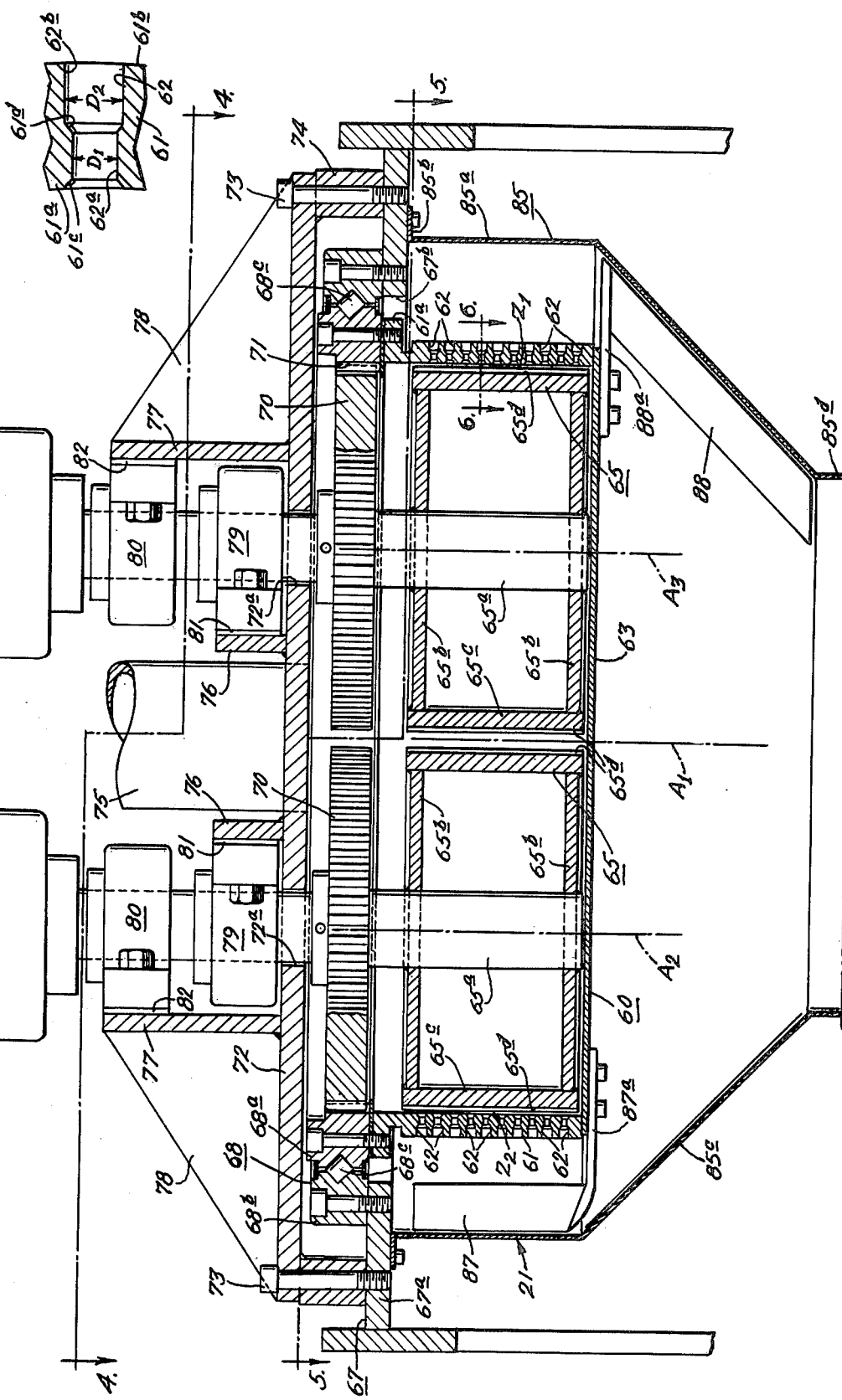
FIG. 2 is a sectional view of rotary extrusion apparatus for macerating plants.

As best seen in FIG. 1, the macerator 21 is carried by the vehicle 13 at an elevated level behind the driver's compartment 15. The harvested alfalfa is supplied to the macerator 21 through a tube or conduit 26 which is connected to the blower-chopper 19. As best seen in FIG. 2, the tube 26 has diverging leg portions 26a and 26b which turn downwardly into the top of the macerator 21 to provide means for distributing the alfalfa at diametrical locations in the macerator 21.

The macerated alfalfa emerges from the bottom of the macerator 21 and enters a hydraulically-powered screw conveyor or auger 23 which conveys the macerated alfalfa to the dewatering press 22 located on the side of the vehicle 13 opposite the macerator 21.

The dewatering press 22 has an inlet at its upper end for receiving the macerated alfalfa supplied by the conveyor 23. The alfalfa advances clockwise in the press and is squeezed therein. Liquid expressed from the alfalfa is collected in a drain 30 at the bottom of the press 22. The pressed alfalfa fiber is expelled from the press 22 and into a blower 31 mounted behind the press 22. An upwardly and rearwardly curved chute 32 is connected to the outlet of the blower 31 to direct the pressed fiber rearwardly into the trailer 20 for collection therein.

The structure and operation of both the macerator and the dewatering press will be described more fully hereinafter. It is sufficient to note at this juncture that the macerator functions to rupture the cells of the leaves and stalks of the alfalfa plant by extruding them through shaped orifices. The dewatering press functions to separate the alfalfa plants into liquid and fibrous fractions by applying relatively high pressures to the macerated plants for a sufficient period of time to allow the liquid to flow by gravity from the plants.

The liquid fraction collected at the bottom of the dewatering press 22 is separated into a first liquid component having a protein value and a deproteinized second liquid component having a fertilizer value. To this end, the drain 30 of the press 22 is connected by a conduit 38 to a pump 39 which is connected by a conduit 40 to a heat-exchanger 41. The heat exchanger 41 is connected by a conduit 42a and flexible coupling 42b to a holding or fractionating tank 44 located on the rear of the vehicle 13 behind the macerator 21 and alongside the blower 31. The heat exchanger 41 is connected to means on the vehicle 13 for generating a source of heat, such as the hydraulic fluid which drives the various hydraulic motors and actuators employed on the vehicle. If desired, heat may be obtained directly from the cooling system of the engine. The liquid fraction may also be heated by injecting steam into the liquid fraction. The steam may be generated in the cooling system of the engine and supplied, for example, from the engine radiator, with suitable provision being made to carry make-up water on the vehicle.

The heat exchanger 41 and the fractionating tank 44 should have a sufficient capacity to heat about 4500 gpm of the liquid fraction to a temperature of about 80° C. and to maintain the liquid fraction at that temperature for about 2-4 minutes. The heating which occurs in the heat exchanger 41 and the holding which occurs in the fractionating tank 44 causes the proteins contained in the liquid fraction to coagulate. The coagulated proteins form a bright green curd having the texture of cottage cheese. Because of its low density, the curd rises to the surface of the liquid or whey contained in the fractionating tank, and this permits the curd to be separated from the underlying liquid by conventional skimmers in the tank 44. If desired, a centrifugal separator may be utilized satisfactorily.

After separation from the whey, the curd is fed into a storage container 46 through a flexible coupling 47. Preferably, the storage container 46 is maintained under a slight vacuum by a pump 48 to draw the curd from the fractionating tank 44.

To facilitate separation of the curd from the whey, it is desirable to maintain the liquid fraction relatively quiescent in the fractionating or holding tank 44. To this end, the fractionating tank or vessel 44 is mounted to the vehicle 13 by gimbal means which enables the fractionating tank 44 to pivot about horizontal axes extending both longitudinally and transversely with respect to the path of movement of the vehicle 13. As best seen in FIG. 1, the illustrated gimbal mounting means includes a pair of upstanding A-frame members 49,49 which mount bearings 50,50 at their upper ends. The bearings 50,50 rotatably receive trunnions which extend transversely outward from a rectangular frame 52. The frame 52 mounts a pair of bearings 53,53 which receive trunnions 54,54 extending longitudinally outward from the fractionating tank 44. With this structure, the fractionating tank 44 is capable of pivoting about intersecting horizontal axes provided by the trunnions in response to pitch and roll motion of the vehicle 13. As a result, the liquid contained in the fractionating tank 44 is maintained substantially level as the vehicle 13 advances, thereby facilitating gravitational separation of the curd from the whey.

The residual liquid fraction or whey contained in the fractionating tank 44 includes chemical compounds which are known to promote plant growth. For example, standing alfalfa containing 80% moisture and 20% protein can yield a whey consisting of 94% water and 6% dry matter, by weight. The dry matter is composed of chemical compounds of the elements nitrogen, phosphorous, potassium, and other growth-promoting trace element compounds. As used herein, the term fertilizer value refers to these chemical compounds.

The deproteinized liquid or whey is applied onto the field as the alfalfa is being harvested and processed. For this purpose, applicator means is provided on the vehicle 13 for spreading the whey on the field. In the illustrated embodiment, the whey is applied by a sprayer assembly 50 which is mounted beneath the vehicle 13. As best seen in FIG. 1, the sprayer assembly 56 comprises an elongated manifold 57 and a series of spray heads 58,58 depending from the manifold 57 in spaced relation therealong. The manifold 57 is connected to the bottom of the fractionating tank 44 by a conduit 59 and a flexible coupling 55. Although the whey will flow by gravity from the fractionating tank 44 and to the spray heads 58,58, it may be desirable to install a pump in the conduit 59 between the tank 44 and the manifold 57 to increase the spraying pressure at the spray heads 58. In the present gravity flow system, the manifold 56 has a length which is substantially coextensive with the width of the harvesting header 18 so that the whey is spread substantially uniformly across the width of the swath cut by the harvesting head 18.

The alfalfa plants are shredded thoroughly and efficiently by causing them to be forced through a series of relatively small openings in the rotary extrusion apparatus or macerator 21 which functions to rupture the cells of the alfalfa plants. To this end, the macerator 21 includes a rotary die ring 60 having a cylindrical peripheral wall 61 and a bottom wall 63 extending transversely across the lower end of the peripheral wall 61. The peripheral wall 61 has a series of extrusion orifices 62,62 which extend radially outward through the wall 61. The die ring 60 is open at its upper end to afford downward infeeding of the alfalfa plants into its interior.

The alfalfa plants are forced through the orifices 62,62 by pressure-applying means provided at diametrical locations in the die ring 60. In the present instance, the pressure is applied by roller means which comprises a pair of hollow rollers 65,65 mounted at diametrical locations in the die ring 60 for rotation about axes $A_2$ and $A_3$ extending parallel to the central axis $A_1$ of the die ring 60. Preferably, each roller 65 has a central shaft 65a which projects upwardly beyond the upper end of the die ring 60. The shaft 65a mounts a pair of axially-spaced circular plates 65b,65b, and a cylindrical wall 65c surrounds the circular plates 65b,65b. As best seen in FIG. 5, a plurality of axially-extending grooves or serations 65d,65d are spaced apart around the periphery of each roller wall 65c to provide an effective means for gripping the plants. Each roller 65 is substantially as high as the peripheral wall 61 of the die ring 60, and the outside diameter of each roller 65 is slightly less than the radius of the die ring 60 measured from its axis $A_1$ to the inside of the die ring wall 61. This dimensional relation provides a gently tapered nip 66 between the periphery of each roller 65 and the inside of the die ring wall 61. The tapered nip cooperates with the roller gripping means to facilitate the gripping of alfalfa plants by the rollers 65,65 and the feeding of the plants between the rollers 65,65 and the die ring 60 as they rotate in the directions indicated by the arrows in FIG. 3. This enables each roller 65 to cooperate with the die ring wall 61 to apply pressure in a radial direction to alfalfa plants interposed therebetween for extruding the alfalfa plants outwardly through the orifices 62,62.

Figure 3:
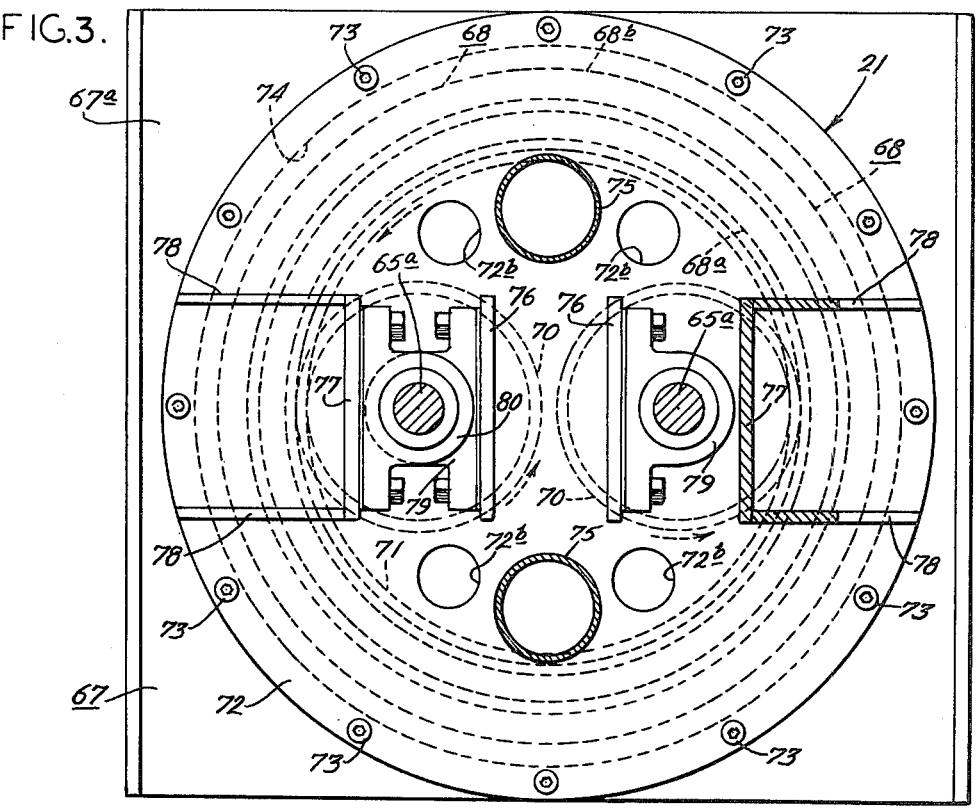
FIGS. 3 and 4 are sectional views taken on lines 4—4 and 5—5, respectively, of FIG. 3.

The die ring 60 and the rollers 65,65 are rotatably supported by means of a frame 67. In the illustrated embodiment, the frame means 67 includes a plate 67a and thrust bearing means 68 rotatably mounting the die ring 60 to the frame plate 67a. As best seen in FIG. 3, the frame plate 67a has a circular central aperture 67b which surrounds an outwardly-extending peripheral flange 61a on the die ring wall 61. The bearing 68 has an inner ring 68a bolted onto the top of the die ring flange 61a, and the bearing 68 has an outer ring 68b bolted onto the top of the frame plate 67a. The bearing 68 has a plurality of rolling elements 68c interposed at an angle between the inner and outer rings 68a and 68b to enable the bearing to accept both radial and thrust loads. Thus, the die ring 60 is rotatably supported around its upper periphery in the frame 67.

Figure 4:
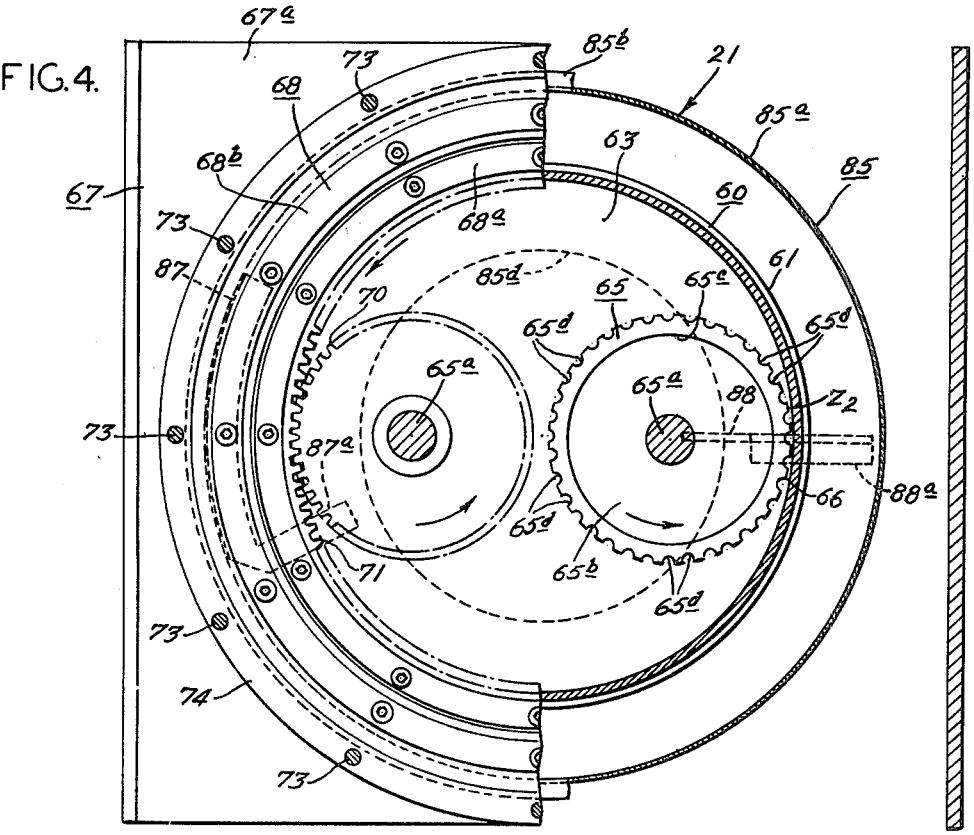

The rotation of the die ring 60 is synchronized with the rotation of the rollers 65,65. To this end, gearing means is provided to couple the die ring 60 and the rollers 65,65 so that they have substantially equal peripheral velocities at the diametrical die ring extrusion zones $Z_1$ and $Z_2$. As seen in FIG. 4, the gearing means includes a spur gear 70 mounted to the roller shaft 65a above the upper end of the roller 65, and a ring gear 71 integral with the inner ring 68a of the bearing 68. The ring gear 71 has internal teeth which mesh with the external teeth on each spur gear 70. The pitch diameter of each spur gear 70 corresponds substantially to the outside diameter of each roller 65, and the pitch diameter of the die ring gear 71 corresponds substantially to the inside diameter of the die ring 60. Thus, ahead of the nip 66 between the roller 65 and the die ring 60, the peripheral speed of the roller 65 is greater than the peripheral speed of the die ring wall 61, while at the zone of maximum outward extrusion (between the die ring wall 61 and the roller 65) the peripheral speed of the die ring wall 61 and each roller 65 is substantially equal. This relation promotes infeeding of the plant matter into the extrusion zones $Z_1$ and $Z_2$ (FIG. 3) and extrusion of the vegetation.

The plant matter to be macerated is distributed uniformly in the die ring 60. For this purpose, distributor means is provided to feed the plant matter into the die ring 60 at diametrical locations ahead of the rollers 65,65. In the illustrated embodiment, the distributor means includes a circular cover plate 72 which overlies the upper end of the die ring 60 and which is spaced from the die ring 60 by a peripheral spacer ring 74. The cover plate 72 and the spacer ring 74 are removably secured to the frame 67 by a series of circumferentially-spaced bolts 73,73 which depend through the spacer ring 74 and into the frame plate 67a. A pair of inlet tubes or ferrules 75,75 are provided at diametrical locations in the cover plate 72 and are offset 90° with respect to the rollers 65,65. The inlet ferrules 75,75 are adapted to be connected to the downturned ends of the legs 26a and 26b of the feed conduit 26 (See FIG. 1). Preferably, the cover plate 72 is provided with several openings 72b to afford the escape of air entrained in the alfalfa from the interior of the die ring. Thus, plant matter to be extruded in the die ring 60 is fed downwardly through the ferrules 75,75 and is distributed substantially evenly in the die ring 60 at locations ahead of the rollers 65,65 where the plant matter can be readily gripped by the rollers 65,65.

A substantial amount of pressure is applied to the plant matter to extrude it through the orifices 62,62 in the die ring wall 61. In order to enable the rollers 65,65 to apply the pressure continuously, bearing means is provided above the cover plate 72 to mount the rollers 65,65 for rotation in the die ring 60. As best seen in FIG. 2, the roller shafts 65a, 65a project upwardly through a pair of holes 72a,72a in the cover plate 72, and the bearing means is mounted in a recess provided by mounting means which protrudes upwardly from the topside of the cover plate 72 adjacent each aperture 72a. In the present instance, the mounting means includes a short upwardly-protruding mounting plate 76 welded to the topside of the cover plate 72 adjacent each aperture 72a and a long upwardly-protruding mounting plate 77 welded to the topside of the cover plate 72 on the side of the aperture 72a opposite the short mounting plate 76. The long mounting plate 77 is reinforced by a pair of gusset plates 78,78 which extend outwardly toward the edge of the cover plate 72. The upper end of the roller shaft 65a projects upwardly intermediate the mounting plates 76 and 77 and is received in axially-spaced pillow blocks 79 and 80 which are bolted to the mounting plates 76 and 77, respectively. Preferably, shims 81 and 82 are interposed between the bases of the pillow blocks 79 and 80 and the mounting plates 76 and 77 in order to provide means for adjusting the spacing between the outer periphery of the rollers 65,65 and the inner periphery of the die ring wall 61.

In order to provide the power to drive the die ring 60 and the rollers 65,65, means is provided to rotate each roller 65. In the illustrated embodiment, the rotating means includes a conventional hydraulic motor 82 connected to the upper ends of each roller shaft 65a. The hydraulic motors 82,82 are connected to the frame 67 by suitable brackets (not shown). Preferably, each hydraulic motor 82 is of about 25 horsepower and rotates at a constant speed of 200 rpms. Thus, with the gearing means coupling the rollers 65,65 to the die ring 60, the die ring 60 rotates about its axis $A_1$ at a speed of about 100 rpms. This speed has the effect of causing the alfalfa fed into the die ring 60 to be forced outwardly against the die ring wall by centrifugal force. The macerator 21 has a capacity of macerating 60,000 lbs./hr. of freshly-harvested alfalfa.

The macerated plant matter expelled from the die ring 60 is collected by means of a shroud 85 which depends from the frame plate 67a and surrounds the die ring 60. As best seen in FIG. 2, the shroud 85 has a cylindrical upper wall 85a which surrounds the peripheral wall 61 of the die ring 60 and an outturned flange 85b which is bolted to the underside of the frame plate 67a. The shroud 85 has a funnel-shaped lower wall 85c which depends from the cylindrical wall 85a and terminates in a central outlet 85d coaxial with the rotational axis $A_1$ of the die ring 60. Thus, plant matter discharged from the die ring 60 is collected in the shroud 85 and is discharged from the common outlet 85d.

The shredded plant matter is displaced positively in a downward direction in the shroud 85 as the macerator 21 operates. To this end, impeller means is provided in the shroud 85 and is rotatable in response to rotation of the die ring 60. In the present instance, the impeller means includes a pair of blades 87 and 88 which sweep across the inner surface of the shroud 85 as the die ring rotates. As best seen in FIGS. 3 and 5, the blades 87 and 88 have radially extending mounting arms 87a and 88a, respectively, both of which bolt onto the underside of the transverse wall 63 of the die ring 60. The upper blade 87 inclines upwardly and rearwardly (relative to the direction of motion of the die ring 60) between the inside of the upper shroud wall 85a and the outside of the die ring wall 61. The lower blade 88 depends along the inside of the lower shroud wall 85c. Both blades 87 and 88 have outer edges located in close proximity with the inside of the shroud 85. With this structure, rotation of the die ring 60 about its axis $A_1$ causes both blades 87 and 88 to sweep along the inner surface of the shroud 85 and thereby to displace shredded plant matter in a generally downward direction through the shroud 85 and toward its outlet 85c.

The macerator 21 is specially designed to rupture the cells of legumes such as alfalfa. To this end, each of the die ring extrusion orifices 62,62 has a predetermined shape which provides a controlled compression and expansion of the plant matter within the wall 61 of the die ring 60 as the plant matter is forced therethrough. As best seen in FIG. 5, each orifice 62 has a generally cylindrical cross-section with different diameters at axially-spaced locations in the die ring wall 61. For example, each orifice 62 has a surface 62a with a minor inner diameter $D_1$ adjacent the inner surface 61a of the die ring wall 61, and each orifice 62 has a surface 62b with a major outer diameter $D_2$ adjacent the outer surface 61b of the die ring wall 61. The major diameter $D_2$ is greater than the minor diameter $D_1$ in a ratio of about 1.3:1.0. Preferably, a chamfered surface 61c connects the inner die ring surface 61a and the surface 62a of the orifice 62, and a chamfered surface 61d connects the surfaces 62a and 62b of the orifice 62. Preferably, the total length of the surface 62b is substantially equal to one-half the thickness of the die ring wall 61. By way of example, the die ring wall 61 has a thickness of about 1 inch, and the orifice 62 has a minor diameter $D_1$ of about 7/16 inch. Preferably, the orifices 62,62 are drilled on vertical centers of about 11/16 inch and on circumferential centers of about ¾ inch around the periphery of the die ring wall 61. Although the particular shape, spacing, etc. of the orifice will vary, depending on the type of material to be macerated, the shape of the orifice 62 disclosed herein is particularly suited for macerating alfalfa plants.

While a preferred embodiment of a rotary extrusion apparatus has been described in detail, various modifications, alterations and changes may be made without departing from the spirit and scope of the present invention as defined in the appended claims.

I claim:

1. Rotary extrusion apparatus, comprising:
   frame means including a plate having a circular aperture,
   a die ring carried in said frame means interiorily of said aperture,
   said die ring having a cylindrical wall with extrusion orifices therein,
   means for feeding extrudable material into said die ring including distributor means carried by said frame means for depositing said material in said die ring,
   bearing means surrounding said cylindrical wall adjacent one end of said die ring to mount said die ring for rotation in said frame means, said bearing means having inner and outer rings with the outer ring being mounted to said plate around said aperture and the inner ring being mounted to said die ring wall so that said die ring depends below said frame plate,
   roller means disposed inside said die ring for rotation in close proximity with the inside of said die ring wall, said roller means including a pair of rollers disposed at diametrical locations in said die ring, each roller having a diameter slightly less than the inside radius of said die ring wall to provide an elongated nip between each roller and the die ring to improve feeding of the material between the rollers and the die ring,
   means for rotating said roller means, and
   means coupling said roller means to said die ring to cause said roller means to rotate with said die ring, whereby material fed into the die ring is extruded through the extrusion orifices upon rotation of the die ring and roller means.

2. Apparatus according to claim 1 wherein said one end of said die ring is open to receive material from said distributor means, said frame means includes a cover plate extending across said open end of said die ring, and said distributor means includes a pair of inlets affording access into said die ring through said cover plate at diametrical locations intermediate the locations of said rollers.

3. Apparatus according to claim 2 wherein said rollers have drive shafts extending through said cover plate, and including means carried by said cover plate for rotatably mounting said shafts on the side of said plate opposite said die ring.

4. Apparatus according to claim 3 wherein said shaft mounting means includes a pair of plates projecting from said cover plate along opposite sides of each shaft, a pair of axially-spaced pillow blocks mounted between said plates, and means mounting said pillow blocks to said plates to afford adjustment of the spacing between the outer periphery of each roller and the inner periphery of the die ring.

5. Apparatus according to claim 3 wherein said roller rotating means includes motor means connected to each roller shaft above said cover plate to rotate said shafts.

6. Apparatus according to claim 5 wherein said roller and die ring coupling means includes an internal gear carried by the inner ring of said bearing means and a spur gear mounted to each roller shaft and engaged with said internal gear.

7. Apparatus according to claim 6 wherein said internal gear is of substantially the same diameter as said die ring and each spur gear is of substantially the same diameter as the roller.

8. Apparatus according to claim 1 including a shroud surrounding the periphery of said die ring in spaced relation therewith, means mounting said shroud to said frame plate, means providing an outlet in said shroud, impeller means disposed between said die ring and said shroud for displacing extruded material away from said die ring wall and toward said outlet means, and means for rotating said impeller means.

9. Apparatus according to claim 8 wherein said impeller means includes blade means extending along the inside of the shroud and said impeller rotating means includes means mounting said blade means to said die ring for rotation therewith.

10. Apparatus according to claim 1 wherein each extrusion orifice has a predetermined cross-sectional area opening into the interior of the die ring and a larger cross-sectional area opening outwardly to the periphery of the die ring.

11. Rotary extrusion apparatus, comprising:
frame means,
a die ring carried in said frame means,
said die ring having a cylindrical wall with extrusion orifices therein,
means for feeding extrudable material into said die ring,
bearing means surrounding said cylindrical wall adjacent one end of said die ring to mount said die ring for rotation in said frame means, said bearing means having an outer ring mounted to said frame means and an inner gearing ring connected to said die ring so that the die ring depends therefrom,
at least a pair of rollers disposed inside said die ring for rotation in close proximity with the inside of said die ring wall,
means for rotating said roller means, including a shaft connected to each roller and projecting away from said one end of said die ring and motor means for rotating each shaft,
means coupling said roller means to said die ring to cause said rollers to rotate with said die ring and in the same direction, said coupling means including a spur gear mounted to each shaft and an internal gear carried by said inner gearing ring and meshing with said spur gears,
whereby material fed into the die ring is extruded through the extrusion orifices upon rotation of the die ring and roller means.

12. Apparatus according to claim 11 including a shroud surrounding the periphery of the die ring and having a central outlet opposite said one end, and impeller means carried by said die ring for rotation therewith to scrape the interior of the shroud and to displace extruded material downwardly to and through said shroud outlet.

13. Apparatus according to claim 11 including a cover overlying said gears and said die ring and distributor means mounted to said cover for flowing extrudable material downwardly through said cover and into said die ring at spaced locations ahead of the rollers.

* * * * *